E. H. CROSSEN.
PISTON FOR INTERNAL COMBUSTION MOTORS.
APPLICATION FILED JUNE 17, 1918.

1,327,462.

Patented Jan. 6, 1920.
2 SHEETS—SHEET 1.

INVENTOR
EDGAR H. CROSSEN
BY
E. R. Inman
ATTORNEY

E. H. CROSSEN.
PISTON FOR INTERNAL COMBUSTION MOTORS.
APPLICATION FILED JUNE 17, 1918.

1,327,462.

Patented Jan. 6, 1920.
2 SHEETS—SHEET 2.

INVENTOR
EDGAR H. CROSSEN
BY
E. R. Inman
ATTORNEY

UNITED STATES PATENT OFFICE.

EDGAR H. CROSSEN, OF FRANKLIN, PENNSYLVANIA.

PISTON FOR INTERNAL-COMBUSTION MOTORS.

1,327,462.  Specification of Letters Patent.  Patented Jan. 6, 1920.

Application filed June 17, 1918. Serial No. 240,408.

*To all whom it may concern:*

Be it known that I, EDGAR H. CROSSEN, citizen of the United States, residing at Franklin, in the county of Venango and State of Pennsylvania, have invented certain new and useful Improvements in Pistons for Internal-Combustion Motors, of which the following is a specification.

While this invention relates solely to pistons for internal combustion motors, and especially to those motors which are adapted to use the heavier oils as fuel, I have, for the purpose of enabling others,—without previous experimentation—to make and use the same, shown the whole cylinder of one form of engine with which my improved piston is adapted to coöperate.

Figure 1:
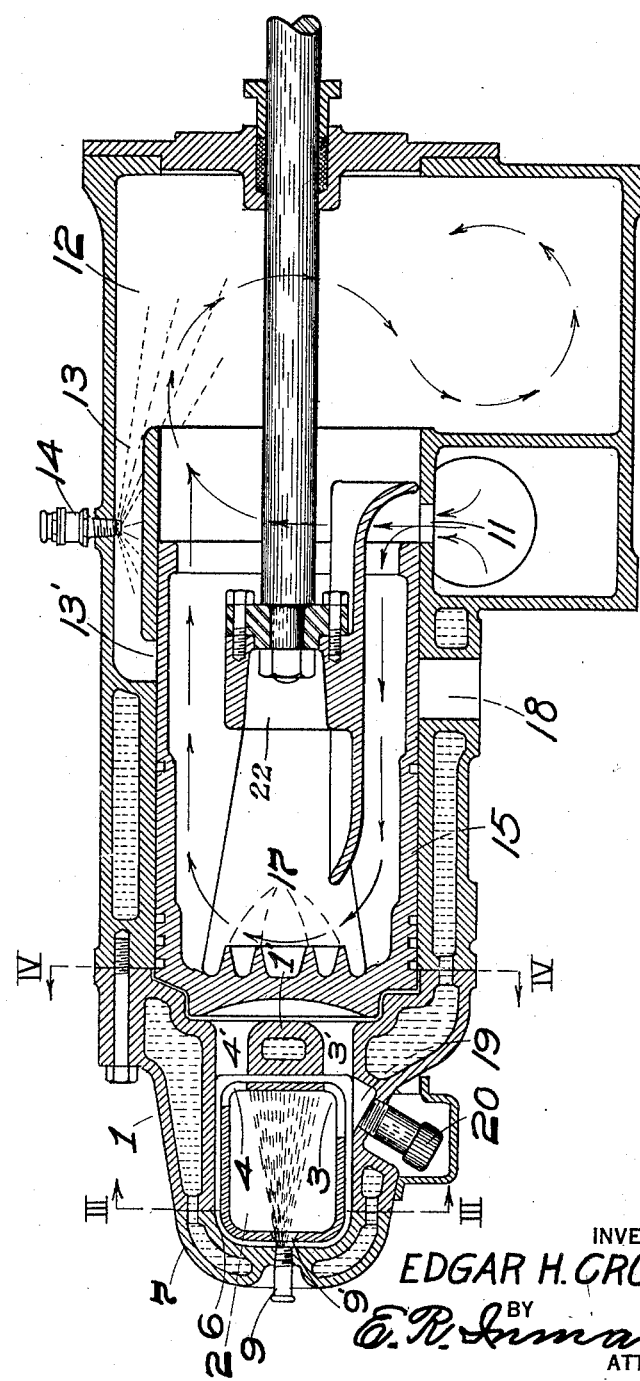
Figure 1 is a central, vertical, longitudinal section of the cylinder and piston of an engine embodying my invention: This view shows the piston at the compression end of the stroke, which is also the position in which air enters the pump chamber of the cylinder.
Figure 2:
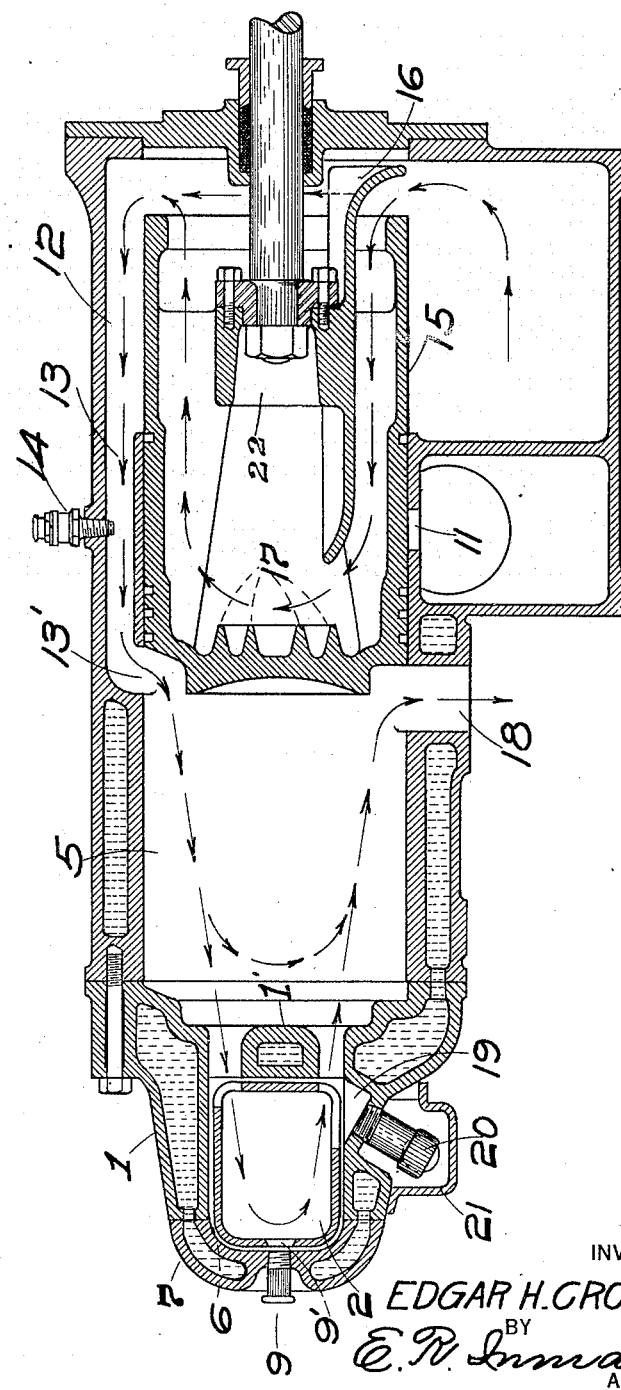
Fig. 2 is a central, vertical, longitudinal section of said cylinder and its piston, showing said piston at the forward end of its stroke; this is the position in which air is transferred from the pump chamber to the expansion chamber of the cylinder.

The construction shown in said drawings is substantially as follows:

Within the cylinder head 1 of the engine, is arranged a combustion chamber 2, which is provided with ports 3 and 4, that communicate, through the supplementary ports 3′ and 4′ with the expansion chamber 5 at the rear of the piston 15. Said combustion chamber is spaced from the surrounding walls of head 1 by an intervening space 6, which is accessible to the gases of combustion, for the purpose of maintaining said chamber 2 in a highly heated condition when the engine is in operation. The outer end of said head 1 is supplied with a removable cap 7, for convenience of assembly, repairs, etc. A suitable nozzle 9 enters said cap 7, at the central portion thereof, through which fuel oil is injected into said combustion chamber through the port 9′.

The engine here shown is of the type commonly known as a three-port engine, and the action of the piston controls the passage of air through the inlet port 11 into the pump chamber 12, also the passage of air from said chamber 12 through the by-pass 13 and through the transfer port 13′ into said combustion chamber 5.

An atomizer 14 supplies water in the form of a fine spray or mist to the air as it passes through said by-pass. The construction and operation of said atomizer are fully shown and described in my co-pending application Serial Number 297,683 filed May 16, 1919.

As previously stated, the combustion chamber 2 is kept, while the engine is in operation, in a highly heated condition. Oil is injected into said chamber when the piston is at the point of highest compression, as shown in Fig. 1, and when said oil injection occurs a jet of flame shoots out through the ports 3, 3′, 4 and 4′ into the expansion chamber 5 and against the rear or adjacent face of the piston 15. Because of the action of the flame upon said face of the piston it is necessary to provide some special means whereby the piston may be kept from becoming too highly heated. Said cooling means is provided in the following manner:

I locate within the piston 15 a deflector 16, which is a horizontally-disposed plate with its forward end projecting beyond the forward end of the piston, and with its projecting edge turned downwardly, so as to overlap or overreach the inlet port 11 when said piston is at the rearward end of its stroke as shown in Fig. 1, and as the air enters said pump chamber 12 it is deflected into the chamber of the piston, and a portion of this air impinges upon the rear wall of the piston and upon the ribs or flanges 17 carried by said rear wall, and thereby serves to cool the piston. It is at this juncture that the products of combustion pass out through the exhaust port 18.

For the purpose of providing means for starting the engine, I form in the inner wall of the head 1, at the bottom thereof, a pocket 19 and connect thereto a retort 20, which is a tubular element closed at its lower end, the upper end thereof being open and in communication with said pocket 19.

Said retort is protected by a cap or hood 21 which is provided with a suitable opening into which the flame of a torch may be directed to heat said retort. When the engine is to be started from the cold state, said retort is heated to substantially a red heat; oil is then injected into the chamber 2 through the nozzle 9, and drains down into said retort where it is vaporized, then as the piston is caused to assume or approach the position shown in Fig. 1 the vapor ignites and starts the engine running and thereafter it continues to run in the normal way.

It is the deflector member 16, and the way in which it is carried by the piston which form the subject-matter of the invention covered hereby.

I am aware that pistons have heretofore been supplied with deflectors for performing substantially the same function as the one here employed; said deflectors have thus far, however, been cast or formed integrally with the piston walls, whereas, my deflector is in no way attached to the walls of the piston, but is wholly free therefrom, and is carried by the hub 22 at the center of the piston. This is an important point, for the reason that, where the deflector is cast integrally with the piston walls it is impossible to keep the walls of the piston, and the deflector from heating unevenly, and this uneven heat causes a different degree of expansion betwen said walls and said deflector; this causes the piston to warp in various ways the most common of which is to assume a shape that is out of round, or it may sometimes bend longitudinally, ocasionally it will cause the piston walls to crack. Such defects not only cause the piston to stick in the bore of the cylinder, but they may also necessitate the replacement of the piston by a new one. My deflector is not cast integrally with the circumferential walls of the piston, and while this is the most obvious way to supply a deflector, I have discovered it to be a wrong way and one which is likely to cause much trouble. While I have shown my deflector as being cast integrally with the hub 22 of the piston, it need not necessarily be so made; it may, in some way be attached to, or carried by the walls of the piston, but if so carried, the method of attachment must be such as to freely permit the differing degrees of expansion of the deflector and said piston walls. Broadly stated, then, this means that the deflector and the walls of the piston shall be a non-unitary or non-continuous structure.

I claim the following:

1. The combination with the cylinder of an internal combustion motor having a fuel port arranged to be piston controlled, of a piston of the trunk type, a longitudinally-disposed deflector carried by said piston which is non-continuous with the circumferential walls thereof, the forward end of said deflector projecting beyond the open end of said piston, arranged to over-reach and to coöperate with said port, as, and for the purpose set forth.

2. In an internal combustion motor, in combination, a cylinder having a port arranged to be piston-controlled for the passage of the motive agent, a piston of the trunk type, a deflector carried by said piston and non-continuous with the circumferential walls thereof, whereby inequality in the degree of expansion of said walls and said deflector is provided for, said deflector extending longitudinally of the piston with its rearward edge in juxtaposition to the rearward wall thereof, the forward edge of said deflector extending beyond the forward end of said piston and adapted to coöperate with said port as and for the purpose set forth.

In testimony whereof I affix my signature in presence of two witnesses.

EDGAR H. CROSSEN.

Witnesses:
MARGARET S. MARTIN,
JOHN L. NESBIT.